United States Patent
Hins

[19]

[11] Patent Number: 5,823,383
[45] Date of Patent: Oct. 20, 1998

[54] PLASTIC WELD POURER COMPONENT

[75] Inventor: Johannes Hins, Sundern, Germany

[73] Assignee: Georg Menshen GmbH & Co. KG, Finnentrop, Germany

[21] Appl. No.: 776,187

[22] PCT Filed: May 8, 1996

[86] PCT No.: PCT/EP96/01931

§ 371 Date: Apr. 10, 1997

§ 102(e) Date: Apr. 10, 1997

[87] PCT Pub. No.: WO96/38349

PCT Pub. Date: Dec. 5, 1996

[30] Foreign Application Priority Data

Jun. 2, 1995 [DE] Germany .................. 295 09 118.5

[51] Int. Cl.$^6$ ...................................................... B65D 6/40
[52] U.S. Cl. ........................ 220/601; 220/613; 215/44; 383/906
[58] Field of Search ................ 383/80, 96, 906; 220/359, 601, 612, 613; 215/232, 44, 370

[56] References Cited

U.S. PATENT DOCUMENTS 3,690,524  9/1972  Harberhauer .

4,732,299  3/1988  Hoyt ................................. 383/906 X

FOREIGN PATENT DOCUMENTS

| 0 661 208 | 7/1995 | European Pat. Off. . |
| 1 367 404 | 11/1964 | France . |
| 2 697 811 | 5/1994 | France . |
| 1 432 159 | 5/1969 | Germany . |
| 4 217 727 | 12/1993 | Germany . |
| 5229566 | 9/1993 | Japan ................................. 383/906 |
| 677 093 | 4/1991 | Switzerland . |
| 680 358 | 8/1992 | Switzerland . |
| 94/19251 | 9/1994 | WIPO . |

*Primary Examiner*—Jes F. Pascua
*Attorney, Agent, or Firm*—Griffin, Butler, Whisenhunt & Szipl, LLP

[57] ABSTRACT

A plastic weld pourer component for connecting to a plastics container part, more particularly a container part of film-like plastics material, comprises at least one welding rib extending circumferentially about a neck portion defining a discharge passage, and having a welding edge or face. The welding edge is provided at a welding flash formed on a rib base portion of the welding rib having a smaller dimension in directions perpendicular to the circumferential direction than that of the rib base portion.

9 Claims, 2 Drawing Sheets

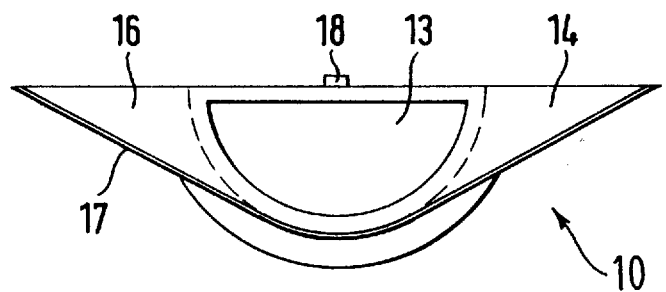
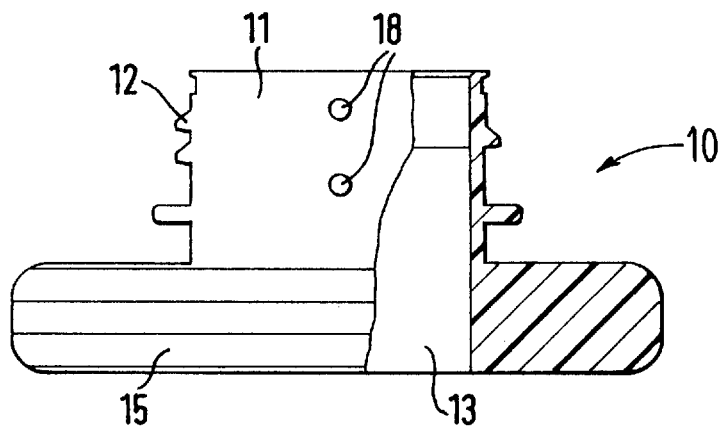
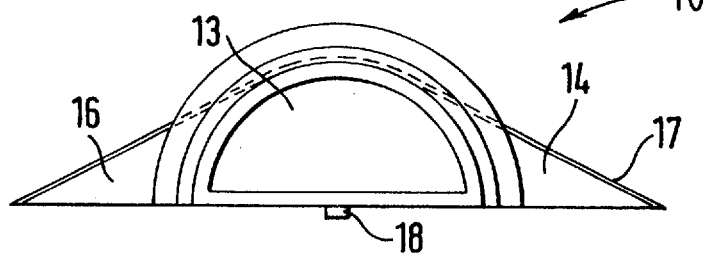

PLASTIC WELD POURER COMPONENT

The invention relates to a weld pourer component of a plastics material for welding to a plastics container part and more particularly to a weld component for connecting to a container part in the form of a refill bag made of a film-like plastics material for the storage of e.g. liquid or pasty detergents.

BACKGROUND

Since a weld pourer component is a dimensionally stable plastics molding, difficulties may be experienced in welding together the different plastics materials due to the elasticity of the film material of the container part, since the film material tends to tear off along the welding zone due to overheating and the like. This is why it is principally desirable, for reasons of good heat transport or in avoiding overheating, to form welding ribs on the weld component as thin-walled as possible. Thin-walled welding ribs may, however, create notch-sensitive welding zones in the film material. It has already been proposed to perform welding ahead a background wall of the weld component so that the film material during welding is able to come into contact with and be supported by the background wall. The disadvantage of this measure is the detrimented removal of heat from the welding zone and thus the danger of the film material being overheated.

SUMMARY OF THE INVENTION

The object of the invention is to provide a plastic weld pourer component of the type mentioned above which permits cost-effective manufacture and may be processed without problems. More particularly, the object of the invention is to prevent tearing off of the film material during welding and in subsequent use.

For achieving this object the weld pourer component according to the present invention for welding to a plastics container part made of film-like plastics material, comprises at least one welding rib extending circumferentially of a neck portion defining a discharge passage and having a welding edge provided on a welding flash integrally formed on a rib base portion of the welding rib and having a smaller dimension in directions perpendicular to the circumferential direction than that of the rib base portion.

Accordingly, each welding rib comprises a relatively thick-walled rib base portion which may have a rounded peripheral surface to which a narrow thin-walled welding web or flash is integrally formed, the outer circumferential edge of which forms a welding edge or face. Due to the thin-walled configuration of the welding flash the temperatures of the film during welding can be readily maintained at such a level that overheating of the film material is effectively avoided.

A firm weld connection is attained since the welding can be controlled so that the welding flash is melted down during welding to such a degree that it practically disappears, thereby permitting a supporting contact of the film material with the rounded relatively wide outer circumferential surface of the rib base portion. As a result the forces occuring during welding and in later use between the weld component and the film bag can be transmitted at the welding zone free of any notch effects to a substantial degree. Thus by surprisingly simple means an effective measure in preventing tearing of the film material is achieved by the invention. Since the rib base portion of the weld component is not involved in the welding operation, or only in an indirect manner, it can be optimized as regards a good heat transport from the welding zone which is a further effective means in preventing the formation of cracks in the region of the welding zone. More particularly, each welding rib may be provided with a large heat-transporting surface like a cooling fin. A thin-walled partition may be provided between adjacent welding ribs for increasing stability, which fixes the radial and axial positions of the welding ribs with respect to each other. Further the weld pourer component in accordance with the invention may be divided along an axial plane, more particularly in the axial center plane, in which each separate portion comprises a discharge passage. Each separate portion may be welded to a separate container part and the two separate portions may then be joined to each other so that an outer configuration results corresponding to that of a one-part weld pourer component in accordance with the invention.

The invention will now be explained in more detail with reference to an embodiment and the drawings.

BRIEF DESCRIPTION OF THE DRAWINGS

FIG. 4 shows a weld pourer component in accordance with another embodiment of the invention as viewed from above, FIG. 5 shows the weld pourer component according to FIG. 4 in a partly sectioned side view, and FIG. 6 shows the weld pourer component according to FIG. 4 as viewed from underneath.

DETAILED DESCRIPTION OF PREFERRED EMBODIMENTS

The weld pourer component in accordance with a preferred embodiment of the invention is an integrally formed part made of a dimensionally stable plastics material, such as polyethylene or polypropylene, which can be inserted in a slot-like opening of a prefabricated container part (not shown) and can be connected thereto permanently by welding, e.g. ultrasonic welding. More particularly, the container part may be made of a film-like plastics material, as is being used more and more for refill bags for storing e.g. liquid or pasty detergents, in minimizing waste. Although the permanent connection between the weld pourer component and container part is generally done by welding, it may also be produced by other methods of heat transport such as hot sealing or by adhesive bonding. It will be appreciated that the invention is restricted neither to the plastics materials nor the application as above-mentioned, it instead also permitting use in other applications with similar advantages, where it is desired to connect a flexible plastics material substantially along a line to a dimensionally stable plastics material.

Figure 1:
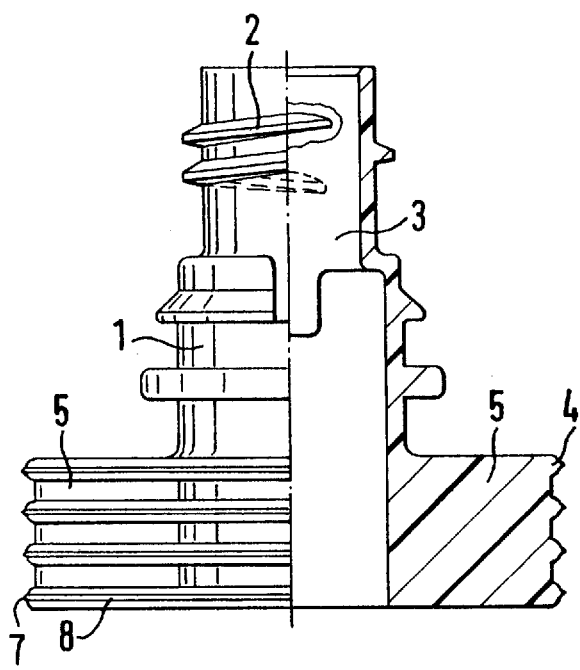
FIG. 1 shows a weld pourer component formed in accordance with the invention in an overall view (left-hand half) and in a longitudinal section view (right-hand half)
Figure 2:
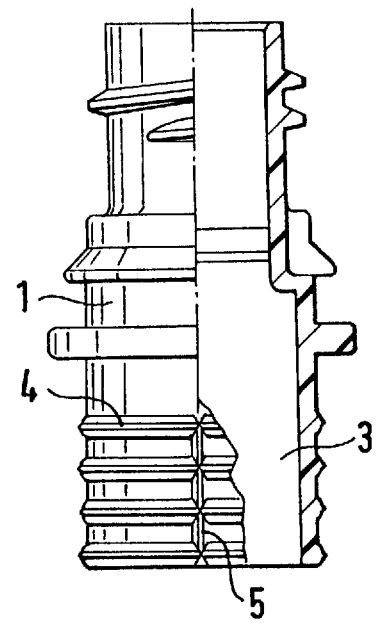
FIG. 2 shows the weld pourer component in a similar represention as that of FIG. 1 but in a side view.
Figure 3:
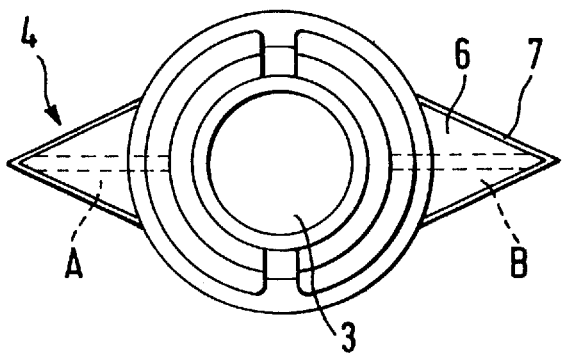
FIG. 3 shows the weld pourer component according to FIG. 1 as viewed from above.

The weld pourer component comprises pursuant to FIGS. 1 to 3, which show a first embodiment of the invention, a substantially tubular neck portion 1 having a suitable axial extension through which a through-passage 3 extends axially. The through-passage 3 provides a communication between the interior of a container part (not shown) and the environment when the weld pourer component is connected to the container part.

On an outer circumferential portion of the neck portion 1 near an axial end thereof a thread 2 may be formed on which a screw closure cap (not shown) may be screwed to close off the through-passage 3. Instead of a screw thread 2 a clamping collar could be provided on the neck portion 1 to secure in a positive manner a closure cap to the weld pourer component by press action.

Along a portion of the neck portion 1 near its other axial end one or more, in the case of the present embodiment four, welding ribs 4 are formed parallel to each other in axial spacing. Each welding rib 4 is located in a radial plane relative to the longitudinal center line of the weld pourer component and comprises a relatively thick-walled rib base portion 6 as well as a welding flash 7 formed on the outer circumferential surface or rim of the rib base portion. The welding flash 7 is also located in the radial plane of the thick-walled rib base portion 6.

The welding flash 7 has a substantially smaller dimension both in the radial and axial directions than that of the rib base portion 6. More particularly, the welding flash 7 has less thickness than the rib base portion 6. It has been found that the thickness of the welding flash 7 relative to that of the rib base portion 6 should be between 1:10 and 1:3, preferably about 1:5, to effectively avoid notch effects and cracking during welding.

The welding flash 7 may have equal dimensions along its full length of circumferential extent. By contrast, the rib base portion 6 of each welding rib 4, as is more particularly evident from FIG. 3, may consist of a pair of sections A, B diametrally opposed relative to the neck portion 1 of the weld component and tapering in a wedge-shape manner outwardly in a radial plane. The sections A, B by their outer circumferences tangentially merge into the neck portion 1 and provide a continuous notch effect minimizing transition of a film bag to be attached by welding when the weld component is inserted in a slot-shaped opening provided in the film bag.

A partition 5 located in the axial center plane, cf. FIG. 1, protrudes radially outwardly from diametral positions of the neck portion 1 and passes centrally through the wedge-shaped sections A, B of each welding rib 4. The partition 5 forms a supporting wall between adjacent welding ribs 4 having the effect that these retain the predetermined radial and axial positions relative to the neck portion 1 when exposed to the stresses occuring during welding or in later use. Due to the stabilizing effect of the partition 5 the thickness of the rib base portion 6 can be dimensioned for an optimum removal of heat from the welding zone whilst simultaneously assuring a good supporting property for the film material to be attached by welding. The partition 5 has preferably a small thickness so that it reduces the exposed surface of the welding ribs 4 only unsubstantially, thereby the heat transport via the welding ribs 4 being affected practically not.

The face of the welding flash 7 forms a welding edge 8 extending circumferentially along the entire welding rib 4. While the outer circumferential surface of the base portion is preferably rounded, the welding edge 8 of the welding flash 7 is preferably flat or tapers outwardly.

In the embodiment of the invention as described above the partition 5 ends in radial length from the neck portion 1 which is only slightly smaller than that of the rib base portion 6 of each welding rib 4, cf. FIG. 1. If desired, the partition could also be extended radially outwardly beyond the welding ribs 4 by a suitably short distance to support the film material to be attached by welding before it is spread in the region of the welding ribs 4. Furthermore, the portion of the partition protruding outwardly may have a lesser thickness than that of the portion located within the welding ribs.

A further embodiment of a plastic weld pourer component in accordance with the invention is shown in FIGS. 4 to 6. This embodiment differs from that already described and shown in FIGS. 1 to 3 essentially in that the weld component is split in an axial plane, preferably in the plane of the partition 5 of the embodiment as described above. This creates two halves as shown in FIGS. 4 to 6 which may be mirror-inverse in configuration.

Each half 10 comprises a neck portion 11 with a cross-sectional configuration corresponding to that of the neck portion 1 of the embodiment described above when halved axially. Each half 10 contains a circumferentially closed through-passage 13 as well as a corresponding part of the welding ribs 14 with rib base portions 16 and welding flashes 17. Apart from being halved axially the welding ribs 14 may be configured the same as the welding ribs 4 of the embodiment as described above so that reference can be made hereto as regards further details.

Each half 10 is provided with congruent means, e.g. in the form of pin/hole connections oriented towards each other, of which only the pins 18 of one half are shown, for connecting the two halves to each other releasably by the pins 18 of one half being inserted in the corresponding receiving holes (not shown) of the other half. When joined together a configuration of the weld pourer component is formed which corresponds substantially to that as shown in FIGS. 1 to 3. Accordingly, a closure cap (not shown) can be screwed onto the thread 12 of the neck portions 11 when completed to close off both of the through-passages 13.

The embodiment of the invention as shown in FIGS. 4 to 6 enables separate container parts of a film material to be attached to each half 10 by welding in the way as already described or to be secured thereto in some other way. After the halves 10 have been joined together the contents of both container parts can be discharged via the through-passages 13 by exerting a force on the container parts, e.g. for bringing two components together for achieving a desired chemical reaction, for mixing them or for applying them to a substrate at a time.

In welding the energy supplied causes the thin welding flashes 7 or 17 to melt whilst the thicker rib base portion 6 or 16 of each welding rib 4 or 14 substantially retains its rounded shape at the outer circumferential surface, so that the film material can abut thereto free from damaging notch effects as soon as the welding flash 7, 17 has melted away.

Above, the invention has been described on the basis of a weld pourer component having welding ribs 4, 14 extending radially to the longitudinal center line of the neck portion. However, if desired, the welding ribs could also be located at an angle to the longitudinal center line. Furthermore, if desired, the welding flash 7, 17 could be divided circumferentially into sections, instead of extending continuously along the circumference of each welding rib 4, 14. Further as regards further configurations of the weld pourer component, various modifications are possible which are obvious to a person skilled in the art due to the teaching given. For instance, the through-passage in the neck portion of the weld pourer component could be closed off by a molded cover having a pull tab to open it, instead of a screw or snap-action cap. Also, a discharger element could be molded to the neck portion. A screw or snap-action cap could be formed integrally to the neck portion via a web or flange for closing off the through-passage hermetically during transporation and storage. After having parted the web or flange the screw or snap-action cap may then be employed as usual to close the through-passage opened by the parting action.

I claim:

1. A plastic weld pourer component for connecting to a plastics container part made of film-like plastics material by welding, comprising:

a tubular neck portion defining an elongated axial through-passage to serve as a discharge passage;

at least one welding rib formed as one piece with the neck portion and circumferentially extending thereabout, said welding rib including a thick-walled rib base portion radially protruding outwardly from an outer surface of the neck portion and having a peripheral outer edge, and a thin-walled welding flash formed as one piece with said rib base portion on the peripheral outer edge thereof and having a smaller radial dimension than that of the rib base portion;

wherein a ratio of an axial dimension of the welding flash relative to an axial dimension of the rib base portion immediately adjacent the peripheral outer edge thereof is between approximately 1:3 and 1:10.

2. The weld pourer component as set forth in claim 1, wherein a plurality of parallel welding ribs is provided axially spaced from each other.

3. The weld pourer component as set forth in claim 2, wherein a partition is formed to extend between adjacent welding ribs.

4. The weld pourer component as set forth in claim 1, wherein each welding rib has, as viewed from above, diametrally opposed sections substantially wedge-shaped in configuration.

5. The weld pourer component as set forth in claim 1, wherein the outer circumferential edge of the rib base portion is rounded.

6. The weld pourer component as set forth in claim 1, wherein the ratio of the axial dimension of the welding flash relative to the axial dimension of the rib base portion at said peripheral outer edge is approximately 1:5.

7. The weld pourer component as set forth in claim 1, wherein the weld pourer component is divided into two parts along an axial plane in which each separate part comprises a discharge passage.

8. The weld pourer component as set forth in claim 7, wherein the separate parts are connectable to each other to complete the configuration of the neck portion to which a closure cap for sealing both discharge passages of the separate parts can be secured.

9. A combination of a container part of film-like plastics material in the form of a refill bag, with a weld pourer component of dimensionally stable plastics materials, said weld pourer component comprising a tubular neck portion defining an elongated axial through-passage to serve as a discharge passage of said refill bag, at least one welding rib formed as one piece with the neck portion and circumferentially extending thereabout, said welding rib including a thick-walled rib base portion radially protruding outwardly from an outer surface of the neck portion and having a peripheral outer edge, and a thin-walled welding flash formed as one piece with said rib base portion on the peripheral outer edge and having a smaller radial dimension than that of the rib base portion, wherein a ratio of an axial dimension of the welding flash relative to an axial dimension of the rib base portion immediately adjacent the peripheral outer edge thereof is between approximately 1:3 and 1:10.

* * * * *